United States Patent [19]

Deaver

[11] 4,005,035
[45] Jan. 25, 1977

[54] COMPOSITION FOR REINFORCED AND FILLED HIGH DENSITY RIGID POLYURETHANE FOAM PRODUCTS AND METHOD OF MAKING SAME

[75] Inventor: Dann T. Deaver, Harper Woods, Mich.

[73] Assignee: Tecnik International Corporation, Mount Clemens, Mich.

[22] Filed: Dec. 24, 1974

[21] Appl. No.: 536,117

[52] U.S. Cl. ............... 260/2.5 AK; 260/2.5 AZ
[51] Int. Cl.$^2$ ..................................... C08G 18/14
[58] Field of Search ............... 260/2.5 AK, 2.5 AZ

[56] References Cited

UNITED STATES PATENTS

| | | | |
|---|---|---|---|
| 2,811,493 | 10/1957 | Simon et al. | 260/2.5 |
| 2,833,730 | 5/1958 | Barthel | 260/2.5 |
| 2,895,603 | 7/1959 | Freeman | 206/406 |
| 2,941,966 | 6/1960 | Campbell | 260/2.5 |
| 3,004,921 | 10/1961 | Stossel | 252/309 |
| 3,009,209 | 11/1961 | Weinbrenner et al. | 18/58 |
| 3,034,996 | 5/1962 | Kaplan | 260/2.5 |
| 3,052,927 | 9/1962 | Hoppe et al. | 18/59 |
| 3,072,582 | 1/1968 | Frost | 260/2.5 |
| 3,079,641 | 3/1963 | Knox et al. | 18/48 |
| 3,080,329 | 3/1963 | Barringer | 260/2.5 |
| 3,091,551 | 5/1963 | Robertson | 117/105.5 |
| 3,150,109 | 9/1964 | Ferrigno | 260/2.5 |
| 3,201,359 | 8/1965 | Herrick et al. | 260/2.5 |
| 3,224,899 | 12/1965 | Wilson | 117/98 |
| 3,242,108 | 3/1966 | McGary, Jr. et al. | 260/2.5 |
| 3,252,775 | 5/1966 | Tocci-Guilbert | 51/296 |
| 3,288,732 | 11/1966 | Chapman et al. | 260/2.5 |
| 3,366,718 | 1/1968 | Komada | 264/45 |
| 3,377,411 | 4/1968 | Charvat | 260/25 AK |
| 3,382,302 | 5/1968 | Marzocchi | 260/2.5 AK |
| 3,396,126 | 8/1968 | Gurley, Jr. et al. | 260/2.5 |
| 3,396,773 | 8/1968 | Alderfer | 152/313 |
| 3,426,110 | 2/1969 | Kesling | 264/46 |
| 3,441,523 | 4/1969 | Dwyer et al. | 260/2.5 |
| 3,456,045 | 7/1969 | Rosen | 265/45 |
| 3,458,609 | 7/1969 | Smith et al. | 264/46 |
| 3,465,052 | 9/1969 | Okamura | 260/652.5 |
| 3,505,437 | 4/1970 | Eichmann et al. | 264/45 |
| 3,510,323 | 5/1970 | Wismer et al. | 106/41 |
| 3,524,825 | 8/1970 | Rill, Jr. | 260/2.5 |
| 3,598,772 | 8/1971 | Hood et al. | 260/2.5 |
| 3,607,794 | 9/1971 | Abbotson et al. | 260/2.5 A |
| 3,607,797 | 9/1971 | Rubens et al. | 260/2.5 AK |
| 3,625,872 | 12/1971 | Ashida | 260/2.5 AK |
| 3,640,920 | 2/1972 | Cear | 260/2.5 AK |
| 3,650,993 | 3/1972 | Zocco et al. | 260/2.5 BD |
| 3,730,919 | 5/1973 | McGinn | 260/2.5 AK |

FOREIGN PATENTS OR APPLICATIONS 848,260   9/1960   United Kingdom .......... 260/2.5 AK

OTHER PUBLICATIONS

Modern Plastics, Oct. 1972, p. 190.

*Primary Examiner*—H.S. Cockeram
*Attorney, Agent, or Firm*—Harness, Dickey & Pierce

[57] ABSTRACT

A composition for reinforced high density rigid polyurethane products including conventional rigid polyurethane foam materials and including silica sand as a filler in quantities ranging from 10% to 75% by weight and chopped glass fibers as a reinforcing agent in quantities ranging from 3% to 25% by weight and the method of making the same with the products having a density of from about 10 to about 80 lb/ft$^3$.

20 Claims, No Drawings

COMPOSITION FOR REINFORCED AND FILLED HIGH DENSITY RIGID POLYURETHANE FOAM PRODUCTS AND METHOD OF MAKING SAME

SUMMARY BACKGROUND OF THE INVENTION

The present invention relates to a composition for reinforced and filled high density rigid polyurethane foam products and the method of making the same.

In the creation of a cellular polyurethane product by the reaction between an isocyanate and a polyol compound containing active hydroxyl groups, it is known that cellular cored products may be molded such as to have a continuous integral skin. The attraction of the integral skin foam molding process lies in its simplicity. The part can be molded in a one shot operation (including a prepolymer and a polyol) by mixing and pouring the reacting liquid components into a mold, which is contoured and textured to the shape and surface finish desired in the finished molded part.

It is also known that the physical properties of the resultant product can be improved by the inclusion of reinforcing fiber. It is also further known that the load bearing capability and density of the polyurethane foam product can be increased by the addition of a particulate filler.

The combination of a reinforcing fiber such as glass and a solid filler such as silica sand incorporated into a self-skinning rigid polyurethane foam, is here shown to provide a product having greater performance capability than that of an unfilled and unreinforced polyurethane composition. In fact, the use of both a particulate filler and reinforcing fiber when used with rigid polyurethane foam yields a product of greater performance than the incorporation of either the filler or fiber exclusively. A combination of advantages in cost and processing result from the urethane/fiber/filler composition as well.

Performance advantages with the use of reinforcing fiber include increased flexural modulus, an increase in heat distortion temperature, and an improvement in the mode of impact failure from one of glass like failure with unreinforced self-skinning rigid urethanes to one of a localized nature without crack propagation in reinforced samples.

In flammability testing, the glass fiber reinforced samples exhibit greater char strength and less tendency toward explosive cracking, shrinkage, and the release of small flaming particles than do the unreinforced samples. The dispersed fiber continues to hold the composition intact without contributing to the full content as the urethane polymer is consumed in the flame.

One problem, however, is that fiber strands tend to agglomerate and distribute themselves in a non-uniform manner while carrying with them large quantities of entrapped air. Such air entrapment yields products having uneven core cell structure and surface air bubbles which are unacceptable in products having a cosmetic requirement.

In addition to the lack of homogeneity in the formulation, further problems arise because of the tendency of the fibers to settle, as a result of normally low viscosity at the mixed materials thereby creating an uneven distribution of fibers in the molded product.

Some processes have been attempted wherein chopped glass fiber has been dispersed in either or both the isocyanate or polyol component of the two component system. It appears that such attempts have proven impractical due to dispensing equipment limitations; it is also believed that these processes yield a product wherein the glass fiber absorbs or isolates the isocyanate or polyol to such a degree that it is not possible to adequately mix and thereby react the polyol or isocyanate contained in the strands of the fiber. This, in turn, yields a product that when cured, still contains unreacted isocyanate or polyol. It would appear that by preventing the necessary wet out of the glass fiber filaments by the reacting foam components prior to gelation, there is a reduction of the higher physical property potential offered by the inclusion of a reinforcing fiber.

The problem then, has been in getting the glass fibers uniformly dispersed in the materials such as to have uniform dispersion in the final product. Even more serious, the ability to effectively include glass fiber in sensitive self-skinning polyurethane compounds has been limited by the ability to eliminate air entrapment or at least to minimize the effects of air entrapped as a result of the addition of the glass fibers.

It is also known that the inclusion of particulate fillers such as finely divided silica, Cab-O-Sil and the like, when dispersed in a rigid polyurethane foam composition, have served to increase the product density, and because of the lower cost of filler as compared to polyurethane foam components, reduce the cost per pound of molded product.

With the addition of the particulate fillers, such as silica, the problem has been in reaching the higher densities. Thus, while the addition of the filler increased density and stiffness the product loses elongation and flexural properties and is given to more brittle behavior under stress. Thus, products molded having high filler loading exhibit little tolerance for bending and impact thereby limiting their utilization in dynamic load applications. Yet the achievement of high density loading is desirable since dramatic cost savings on a per pound of product basis could be realized. In addition the higher density products lend themselves more readily for many applications where weight is a consideration, i.e. furniture items, architectural products, etc. In addition the inclusion of inorganic fillers, e.g. silica sand, into the conventional non-flame resistive high density rigid foams, creates a composition having high flame resistant properties.

In the present invention high filler loadings can be achieved along with the addition of reinforcing materials such as the glass fiber. The effects of air entrapment have been minimized and the glass fiber is uniformly distributed throughout the resultant product. While the higher filler loadings tend towards product embrittlement the glass fiber substantially improves the flexural and resilient characteristics of the product and provides a product having the desired density, stiffness and resilience.

Therefore, it is an object of the present invention to provide a rigid polyurethane foam product having substantially evenly distributed reinforcing glass fiber and having a substantially high loading of filler material such as silica.

In rigid polyurethane foam systems using the polyesters or polyethers the normal processing viscosity is in the range of 350 cps to 700 cps at 74° F. At these viscosities the uniform addition of glass fibers is difficult since the fibers tend to settle during the time between the mixing of the fiber with the polyurethane materials and the time that gelation of the reacting composition occurs. While the addition of the glass fibers will increase viscosity, the loading of the mixture with the silica sand also causes an increase in viscosity. With increased viscosity the fibers (and silica) will more readily maintain their displaced position resulting from mixing and thereby assure uniform distribution in the final product. While an increase in viscosity is desirable the heavy loading will increase viscosity to the point where the flow characteristics are impeded causing problems in even distribution of the mixture in the mold. Thus in the process of the present invention the materials are heated to a temperature of around 115° F to achieve a viscosity of 1200 cps to 3600 cps. At this viscosity the materials will still flow readily into the mold while maintaining the glass fibers in even distribution. Therefore, it is another object of the present invention to provide a process for making rigid polyurethane products having reinforcing with glass fibers and being heavily loaded with a silica sand filler in which the viscosity of the admixed materials is brought into a range of from around 1200 cps to 3600 cps by heating the mixture to a temperature of around 115° F.

In the present invention blowing agents such as those commercially available from DuPont under the trademark Freon are used. However, in elevating the process temperature to around 115° F, it has been found that the lower boiling point blowing agents, i.e. such as Freon 11, trichloromonofluoromethane, B.P. 74.8° F are not suitable since they will begin to boil off before processing can effectively begin. Thus in the present invention a high boiling point blowing agent such as Freon 113, trichlorotrifluoroethane, B.P. 117.6° F has been found suitable. Therefore, it is another object of the present invention to provide a process of the above described type in which a blowing agent having a boiling point above the pre-processing or mixing temperature of the starting materials. Of course, the boiling point is substantially below the in processing temperatures attained resulting from the exothermic reaction of the materials.

While the mixture of filler, such as silica sand, is desirable not all materials are suitable in combination with the glass fibers. The glass fibers contain substantial quantities of entrapped air. Unless the air is evenly dispersed or expelled the result will be structural non-uniformity of product, surface deformities, etc. Thus the quantity of glass fibers added could be severely limited. It has been found that with the addition of a particulate filler over a given mesh size the effects of air entrapment are eliminated or at least substantially minimized permitting substantial loading with glass fibers. With the addition of the filler substantially below the noted mesh size the air entrapment effects are not effectively limited. It has been found that the addition of commercially available silica sand with mesh sizes of from No. 30 U.S. sieve to No. 200 U.S. sieve provides the desired results of effectively limiting the effects of air entrapment. Therefore, it is another object of the present invention to provide a novel process for producing rigid polyurethane foam products having glass fibers by utilizing a particulate filler such as commercially available silica sand having mesh sizes of from No. 30 U.S. sieve to No. 200 U.S. sieve. It is also desirable to utilize the filler materials of the size noted above since higher loading can be obtained without increasing the viscosity of the mix to undesirable levels. Thus the use of finely divided particles, i.e. 2 microns or less not only do not solve the air entrapment problem but also seriously limit the amount of loading capability because of the effects on viscosity.

Other objects, features, and advantages of the present invention will become apparent from the subsequent description and the appended claims.

As noted, the present invention deals with rigid polyurethane foam structures and to this end conventional compounds known in the art for the production of rigid polyurethane foam structures can be used. Thus in the preparation of rigid polyurethane foam products, any of a wide variety of hydroxyl terminated polyols may be used to react with an organic isocyanate and in the presence of a suitable solvent blowing agent (such as Freon 113 one of the Freons noted) produce the desired foamed product.

For the formation of the rigid polyurethane foam a highly branched polyol should be used or selected having a molecular weight, i.e. average weight per branch, of from about 300 to about 800. Examples of suitable polyol materials are the following:

Pluracol 565 (BASF Wyandotte Chemical)
a blend of polyols comprised of propylene oxide derivative of toluene diamine glycerine and propylene glycol — with a Hydroxyl range of 319 – 339.

Plurocol PEP550 (BASF Wyandotte Chemical)
a polyoxypropylene derivative of pentaerythritol — with a Hydroxyl range of 540 – 570.

Isonal 140
a highly crosslinked amine based propoxylated polyether — with a functionality of 4.

The isocyanate can be selected from any one of the following suitable characteristic materials:
TDI: Tolylene diisocyanate (isomer positions being 2, 4 except as designated in text)
MDI: 4, 4' — Diphenylmethane diisocyanate
HDI: 1, 6 — Hexamethylene diisocyanate
NDI: 1, 5 — Naphthalene diisocyanate
DADI: 3, 3' Dimethoxy — 4, 4' — biphenyl diisocyanate ("dianisidine diisocyanate")
TODI: 3, 3' — Dimethyl — 4, 4' — biphenyl diisocyanate ("tolidine diisocyanate")
PDI: Phenylene diisocyanate (isomer positions designated in text)
XDI: 4, 4' — Biphenyl diisocyanate ("xenylene diisocyanate")

In practice, however, prepolymers of the above isocyanates are commercially available and are used. Thus in the present invention the following isocyanate prepolymers have been used:
Isonate 580
Polymethylene polyphenyl isocyanate — having a functionality of 2.7 — a pure polymeric isocyanate
PAPI 105
Polymethylene polyphenyl isocyanate — having a functionality of 2.7

It is known in the art to utilize a surfactant or nucleating agent which acts as a stabilizer in the bubble formation; the surfactant can be selected from known suitable materials such as silicone oil.

It is further known to utilize tertiary amine catalysts; a suitable such catalyst has been dimethyl aminoethanol. Other catalysts are the tin catalysts, i.e. (Stannous octoate).

In the process of the present invention, the temperature of the starting materials is raised in order to reduce overall viscosity. Hence a blowing agent should be selected having a boiling point higher than the pre-process temperatures to which the materials are raised.

Fluorinated, halogenated, saturated aliphatic hydrocarbons may be used as blowing agents; as noted a suitable agent is: trichlortrifluorocthane, B.P. 117.6° F (Freon 113).

The above listing of suitable materials is given by way of example only and not intended to be limiting since the present application does not deal with novel formulations of polyurethane forming materials but indeed utilizes known starting materials as normally used by those skilled in the art to produce rigid foamed polyurethane products. The invention here lies in the addition of glass fibers or the like as reinforcing members and silica sand or the like as a filler material such that commercially acceptable structural products can be realized.

As noted the mixture of sand, with glass fiber and polyurethane components minimizes the problem of air entrapment. When the mixing of the sand, glass and polyurethane components occurs, the sand acts to disintegrate or distribute the air, thereby creating a filled and reinforced foam having a more uniform cell structure as well as minimizing the surface voids which are undesirable from the cosmetic standpoint in rigid self-skinning products. It is found that the mixture referred to causes a more uniform mix consistency than is possible using glass fiber and polyurethane alone, and that the more uniform mix is achieved more quickly with the admixture of silica sand. While the applicant does not wish to be bound by any theory as to why this occurs, it is considered probable that the utilization of the proper filler particle size is such as to cause the subject filler to act as a mixing aid, and to effectively break up entrapped air which is included by the introduction of glass fiber. It has been found that the particle sizes of silica sand that perform satisfactorily are in the range of from U.S. sieve No. 30 to 200. With finely divided silica sand of substantially finer mesh, i.e. 2 microns, the advantages of minimizing effects of air entrapment are degraded. In addition, the viscosity of the starting mixture becomes excessive with appreciable loading hence restricting the amount of loading and product densities which can be practically achieved. With appreciably coarser particles the structural and finish characteristics are degraded.

It has been found that commercially available silica sand as provided by Ottawa Silica Products is suitable; produced by Ottawa Silica Products are three grades of silica sand, all of which appear to perform equally well in the subject process:

|  | U.S. Sieve No. | Percent On Sieve |
| --- | --- | --- |
| No. 1 Mine Run | 30 | 0 |
| Mean Grain Fineness 61.5 | 40 | 2.2 |
|  | 50 | 19.8 |
|  | 70 | 30.8 |
|  | 100 | 32.5 |
|  | 140 | 13.5 |
|  | 200 | 0.9 |
| No. 2 Coarse | 30 | 0 |
| Mean Grain Fineness 55.4 | 40 | 4.2 |
| American Foundry Standard | 50 | 30.7 |
|  | 70 | 32.8 |
|  | 100 | 23.3 |
|  | 140 | 8.4 |
|  | 200 | 0.5 |
| No. 3 Fine | 30 | 0 |
| Mean Grain Fineness 72.5 | 40 | 0.5 |
|  | 50 | 5.2 |
|  | 70 | 20.4 |
|  | 100 | 47.2 |
|  | 140 | 24.1 |

-continued

| U.S. Sieve No. | Percent On Sieve |
| --- | --- |
| 200 | 2.1 |

Loadings of from 10% to 75% by weight of final product of the above noted silica sand have been realized with the preferred range being 20% to 60%.

To achieve the high fiber and filler loadings desired and yet maintain the desirable material flow characteristics during processing, it is necessary to achieve a low viscosity in the polyol/isocyanate combinations being used to create the polyurethane composition. It also appears that the inclusion of silica sand as a filler prevents coalescence of the fluorocarbon blowing agent at the elevated product and tool temperatures being practiced with this invention.

Coalescence, or "ferns" as they are known in the industry are cosmetically and structurally unacceptable on most product surfaces, and are indicative generally of a mold surface that is too high in temperature when conventional liquid reactive urethane components have been dispensed therein for molding. It is believed that the inclusion of silica sand as a filler in the parts by weight outlined in this invention absorbs heat at the mold surface and also maintains the fluorocarbon in uniform dispersion to create discreet bubble sites and thereby uniform cell structure.

Variations in viscosity and result may be encountered when like weights of different types of glass chopped fiber are used. For instance, 10% of the total composition by weight of ¼" chopped fiber having 500 0.00052 dia. filaments per strand with a 0.4% silane (silicone Hydride) sizing (such as PPG (Pittsburgh Plate Glass) No. 3390) will exhibit a lesser increase in the viscosity of the composition than will 10% by weight of ¼" chopped fiber having 200 0.00052 dia. filaments per strand with a 1.5% silane sizing (such as PPG No. 3198). In processing, the 500 filament glass strand mixes into the urethane and sand compositions more rapidly with less inclusion of air than does the 200 filament glass strand, however in the molded part it is believed that less of the filaments of the 500 filament strand are wetted out than of the 200 filament strand fibers, and the physical properties are thereby reduced in the 500 filament strand reinforced products. The uncompacted bulk density of the 500 filament per strand fiber ¼" is 50.19 lb/ft$^3$ while the bulk density of the 200 filament per strand ¼" fiber is 41.32 lb/ft.$^3$ (ASTM test std. D1895 Method A).

Further, viscosity variations are created when each of a variety of fiber lengths are employed. Generally, fibers having a higher bulk density, exhibit an ability to be included into the urethane composition in higher percentages with a lesser effect on the composition viscosity increase than do the fibers with a lower bulk density. For instance, ⅛" glass fiber strands create a lesser increase in viscosity than does ¼" glass fiber strands of the same type when like weights of glass fiber are utilized. In general, the shorter the fiber length, the higher the bulk density and the lesser the increase in the viscosity of the composition.

It is desirable to have chopped fibers in the range of 3% to 25% by weight of the final product. The glass fibers are in the range of 1/32" to 1" in length. Best results were achieved with chopped fibers of 5% to 15% by weight of final product and preferably of ¼" length of the 200 filament per strand noted above. With fibers shorter than 1/32" in length the structural benefits are degraded while with fibers exceeding 1" in length increases in viscosity of the starting materials become undesirable.

The objective of the present process is to provide structural products having a density of 10 to 80 lb/ft³; desirable foam products have a density of 15 to 45 lb/ft³; the structural products noted are not excessively brittle and can have excellent flexural and resilience characteristics as well as excellent surface cosmetic characteristics. The products are generally uniform in composition, i.e. free of excessive voids, blemishes. Since the quantity of urethane products per pound of product is reduced the cost of attaining such products is dramatically reduced. In addition, the viscosity of the working mixture is sufficiently low to greatly assist in the production of parts having the high densities noted.

In the process of the present invention then, the polyol component and isocyanate component are first heated to 115° F. Next the polyol and isocyanate components are mixed vigorously for approximately 5 seconds. Prior to creaming and during the initial mixing the glass fiber and silica sand are mixed in. The mixed components will have a viscosity of approximately 1200 cps to around 3600 cps. This mixture is next dispersed into a mold cavity. The mold temperature is preferably 130° to 140° F. The mold is closed and the foaming proceeds to form the desired part. The following examples illustrate various combinations of filler and reinforcing materials in providing products having the desired characteristics.

EXAMPLE I

Part A comprised of 105 parts by weight polymeric isocyanate (e.g. Upjohn Isonate 580) having an isocyanate equivalent of 140 and a viscosity of 650 CPS at 77° F.

Part B comprised of 50 parts polyol (e.g. Pluracol PEP 550 — BASF Wyandotte) a polyoxypropylene derivative of pentaerythritol, having a viscosity of 1300 CPS at 77° F and a hydroxyl No. of 540 and a molecular weight of 500. 50 parts Polyol (e.g. Pluracol 565 BASF Wyandotte) having a viscosity of 2800 CPS at 77° F and a hydroxyl No. 329, 2 parts surfactant (e.g. DC-193 Dow Corning), 0.075 parts catalyst (e.g. Dabco 33LV Air Products), 0.35 parts catalyst Dimethylaminoethanol (DMAE — Pennwalt), 0.15 parts water and 25 parts trichlorotrifluoroethane (e.g. Freon 113, DuPont) blowing agent.

Part C comprised of 25 parts ¼" long chopped glass fiber (e.g. PPG No. 3198)

Part D comprised of 258 parts No. 1 Mine Run sand. Heat parts A & B to 115° F at atmospheric pressure and then mix Part A with Part B and mix vigorously for 5 seconds. Immediately after mixing A & B and prior to the creaming of the mixture, simultaneously add Parts C and D to the A/B mixture while mixing entire composition for 5 seconds.

The entire mixing procedure from the initial mix of Parts A & B through the mixing of A/B/C/D should take no longer than 10 seconds. The mixed components of approximately 1850 CPS viscosity are then dispensed into a mold cavity, preferably aluminum. The mold should be covered preferably with an aluminum cover. Both the cavity and cover should be clamped together and be capable of withstanding pressures of 30 PSI.

The mold temperature preferably is 130°–140° F. The part may be removed after cooling of the mold and part, in 10–15 minutes and the product when removed from the mold, will have evenly dispersed silica sand and glass fiber with a dense skin containing both sand and fiber surrounding a sand and glass filled low density core. 50% of this example is silica sand, and 5% is chopped glass fiber.

EXAMPLE II

Prepare Part A and Part B as in Example I. Part C comprised of 53 parts of ¼" long chopped glass fiber (e.g. PPG No. 3198) Part D comprised of 71 parts No. 1 mine run sand.

Heat parts A & B to 115° F at atmospheric pressure and then mix part A with part B and mix vigorously for 5 seconds. Immediately after mixing, and prior to the creaming of the mixture, simultaneously add parts C and D to the A/B mixture while mixing entire composition for 5 seconds.

Repeat procedures for molding as in Example I. 20% of this sample is silica sand and 15% is chopped glass fiber.

EXAMPLE III

Prepare a Part A and Part B polyurethane mixture as in Example I. Part C is comprised of 41 parts of ¼" long chopped glass fiber (e.g. PPG No. 3198)

Repeat procedure for mixing Part A and Part B as in Examples I and II. Immediately after mixing and prior to the creaming of the mixture, add Part C to the A/B mixture while mixing the entire composition for 5 seconds.

Repeat procedures for molding as in Examples I and II. 85% of this example is cellular polyurethane composition and 15% is chopped glass fiber.

EXAMPLE IV

Prepare a Part A and Part B mixture as in Examples I-III. Part C is comprised of 41 parts of No. 1 mine run sand.

Repeat procedure for mixing Part A and Part B as in Examples I–III. Immediately after mixing and prior to the creaming of the mixture, add part C to the A/B mixture while mixing the entire composition for 5 seconds. Repeat procedures for molding as in Examples I–III, 85% of this example is cellular polyurethane composition and 15% is silica sand.

EXAMPLE V

Part A comprised of 105 parts polymeric isocyanate (e.g. Isonate 580) having an isocyanate equivalent of 140 and a viscosity of 650 CPS at 77° F.

Part B comprised of 50 parts polyol (e.g. Plurocol PEP-550-BASF Wyandotte) a polyoxypropylene derivative of pentaerythritol, having a viscosity of 1300 CPS at 77° F and hydroxyl No. of 450 and a molecular weight of 500. 50 parts polyol (e.g. Plurocol 565-BASF Wyandotte) having No. of 329, 2 parts surfactant (e.g. DC-193 Dow Corning). 0.075 parts catalyst (e.g. Dabco 33LV Air Products) 0.35 parts catalyst Dimethylaminoethanol (DMAE, Pennwalt), 15 parts water, and 20 parts trichloromonofluoromethane (e.g. Freon 11, Dupont) blowing agent. Part B should be vigorously mixed (e.g. with a Jiffy mixer at 1500–2000 RPM for 30 seconds) prior to mixture with Part B. There are no parts C and D to this example since it is to be unfilled and unreinforced.

Heat parts A and B to 75° at atmospheric pressure and then mix part A with part B and mix vigorously for 7 seconds. The mixed components of approximately 500 CPS viscosity are then dispensed into a mold cavity, as in Examples I–IV. The demolding may be conducted as in Examples I–IV.

This example will serve as being typical of an unreinforced, unfilled, self-skinning rigid urethane composition.

EXAMPLE VI

Prepare Part A and Part B as in Example I. Part C comprised of 8 parts of ¼" long chopped glass fiber (e.g. PPG No. 3198) Part D comprised of parts No. 1 Mine Run Sand, 27 parts. Repeat procedures for molding as in Example I. 10% of this sample is silica sand and 3% is chopped glass fiber. The entire mixing procedure from the initial mix of Parts A and B through the mixing of A/B/C/D should take no longer than 10 seconds. The mixed components of approximately 850 CPS viscosity are then dispensed into a mold cavity, preferably aluminum.

EXAMPLE VII

Prepare Part A and Part B as in Example I. Part C comprised of 106 parts of ¼" long chopped glass fiber (e.g. PPG No. 3198) Part D comprised of parts No. 1 Mine Run Sand, 85 parts. Repeat procedures for molding as in Example I. 20% of this sample is silica sand and 25% is chopped glass fiber.

EXAMPLE VIII

Prepare Part A and Part B as in Example I. Part C comprised of 29 parts of 1/32" long chopped glass fiber (e.g. PPG No. 3198) Part D comprised of parts No. 1 Mine Run Sand, 29 parts. Repeat procedures for molding as in Example I. 10T of this sample is silica sand and 10% is chopped glass fiber.

EXAMPLE IX

Prepare Part A and Part B as in Example I. Part C comprised of 33 parts of 1" long chopped glass fiber (e.g. PPG No. 3198) Part D comprised of parts No. 1 Mine Run Sand, 67 parts. Repeat procedures for molding as in Example I. 20% of this sample is silica sand and 10% is chopped glass fiber.

EXAMPLE X

Prepare Part A and Part B as in Example I. Part C comprised of 47 parts of ¼" long chopped glass fiber (e.g. PPG No. 3198) Part D comprised of parts No. 1 Mine Run Sand, 652 parts. Repeat procedures for molding as in Example I. 70% of this sample is silica sand and 5% is chopped glass fiber.

EXAMPLE XI

Prepare Part A and Part B as in Example I. Part C comprised of 14 parts of ¼" long chopped glass fiber (e.g. PPG No. 3198) Part D comprised of parts No. 1 Mine Run Sand, 27 parts. Repeat procedures for molding as in Example I. 10% of this sample is silica sand and 5% is chopped glass fiber.

The results of samples made from the prior examples are shown in the following Table "A":

TABLE "A"

|  | Example I | Example II | Example III | Example IV |
|---|---|---|---|---|
| COMPOSITION | 45% Polyurethane | 65% Polyurethane | 85% Polyurethane | 85% Polyurethane |
|  | 50% Silica Sand | 20% Silica Sand |  | 15% Silica Sand |
|  | 5% Glass Fiber | 15% Glass Fiber | 15% Glass Fiber |  |
| MOLDED DENSITY | 35 Lbs./Ft³ | 35 Lbs./Ft³ | 35 Lbs./Ft³ | 35 Lbs./Ft³ |
| PROCESSING VISCOSITY | 1850 CPS | 1820 CPS | 1670 CPS | 290 CPS |
| IMPACT STRENGTH | 12 | 14 | 15 | 4 |
| FLEXURAL MODULUS PSI (to skin surfaces) | 205,000 | 245,000 | 210,000 | 155,000 |
| HEAT DISTORTION 264 PSI | 183° F. | 180° F. | 172° F. | 163° F. |
| SURFACE QUALITY | Excellent | Excellent | Poor | Excellent |
| CELL UNIFORMITY | Excellent | Excellent | Poor | Excellent |

|  | Example V | Example VI | Example VII | Example VIII |
|---|---|---|---|---|
| COMPOSITION | 100% Polyurethane | 87% Polyurethane | 55% Polyurethane | 80% Polyurethane |
|  |  | 10% Silica Sand | 20% Silica Sand | 10% Silica Sand |
|  |  | 3% Glass Fiber | 25% Glass Fiber | 10% Glass Fiber |
| MOLDED DENSITY | 35 Lbs./Ft³ | 35 lbs./Ft³ | 35 Lbs./Ft³ | 35 Lbs./Ft³ |
| PROCESSING VISCOSITY | 520 CPS | 370 CPS | 3210 CPS | 470 CPS |
| IMPACT STRENGTH | 10 | 10 | 17 | 10 |
| FLEXURAL MODULUS PSI (to skin surfaces) | 120,000 | 155,000 | 310,000 | 180,000 |
| HEAT DISTORTION 264 PSI | 142° F. | 155° F. | 190° F. | 156° F. |
| SURFACE QUALITY | Excellent | Good | Fair | Excellent |
| CELL UNIFORMITY | Excellent | Good | Fair | Excellent |

|  | Example IX | Example X | Example XI |
|---|---|---|---|
| COMPOSITION | 70% Polyurethane | 25% Polyurethane | 85% Polyurethane |
|  | 20% Silica Sand | 70% Silica Sand | 10% Silica Sand |
|  | 10% Glass Fiber (1") | 5% Glass Fiber | 5% Glass Fiber |
| MOLDED DENSITY | 35 Lbs./Ft³ | 35 Lbs./Ft³ | 35 Lbs./Ft³ |
| PROCESSING VISCOSITY | 2860 CPS | 3080 CPS | 400 CPS |
| IMPACT STRENGTH | 15 | 11 | 12 |
| FLEXURAL MODULUS PSI (to skin surfaces) | 210,000 | 225,000 | 165,000 |
| HEAT DISTORTION 264 PSI | 186° F. | 187° F. | 158° F. |
| SURFACE QUALITY | Fair | Excellent | Good |

TABLE "A"-continued

| CELL UNIFORMITY | Fair | Excellent | Good |

All of the glass fibers were of the PPG 3198 and ¼" unless otherwise noted.
All examples were processed at 115° F. except example V at 75° F.
All silica sand was the No. 1 Mine Run noted.

The impact strength was determined using the ½" falling dart, foot-pounds, reverse side failure. The flexural modulus was determined using ASTM D790 standard. Heat distortion was determined by heating the samples at 7.2° F/minute.

As can be seen the combination of the present invention results in improved heat distortion as compared to the polyurethane alone. Impact strength is at least equal to and can greatly exceed that of the polyurethane alone. Flexural Modulus is vastly superior. In comparing the combination with the polyurethane and silica sand alone, impact strength is greatly improved with the combination and in most cases Flexural Modulus is vastly improved. Note that at the low end of the combination the results are fair to good as far as surface quality and cell uniformity are concerned. Thus the particular combination desired will depend on the application. As can be seen, however, the results are dramatic. Even more dramatic is the improvement in cost reduction especially at the higher loadings of silica sand.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. In a process for manufacturing in a mold a rigid polyurethane foam product having a density of from 10 to 80 lb/ft$^3$ with said foam being formed from the reaction of an isocyanate component and a polyol component having a highly branched polyol having a molecular weight per branch of approximately 300 to 800 with at least one said component including a suitable blowing agent, the steps comprising: heating the polyol component and isocyanate component to a preselected temperature above 74° F, mixing the preheated polyol component and isocyanate component, mixing in silica sand and chopped glass fibers with the viscosity of the admixed components being in the range of from around 1200 cps to around 3600 cps, said chopped glass fibers being in the range of from 3 to 25% by weight of the foamed product, said silica sand being in the range of from 10 to 75% by weight of the foamed product, with the polyurethane being no less than about 20% by weight of the foamed product, said silica sand being of a mesh size of from No. 30 U.S. sieve to No. 200 U.S. sieve, said chopped glass fibers being 1/32" to 1" in length with each fiber being comprised of a plurality of filament strands, heating the mold to a temperature approximately at or above the temperature of the preheated materials, pouring the admixed components into the mold for foaming.

2. In a process for manufacturing in a mold a rigid polyurethane foam product having a density of from 10 to 80 lb/ft$^3$ with said foam being formed from the reaction of an isocyanate component and a polyol side having a highly branched polyol having a molecular weight per branch of approximately 300 to 800, the steps comprising: mixing a fluorinated, halogenated saturated aliphatic hydrocarbon solvent blowing agent in the polyol side, said blowing agent having a boiling point greater than around 115° F, heating the polyol component and isocyanate component to a temperature around 115° F, mixing the preheated polyol component and isocyanate side, mixing in silica sand and chopped glass fibers with the viscosity of the admixed components being in the range of from around 1200 cps to around 3600 cps, said chopped glass fibers being in the range of from 3 to 25% by weight of the foamed product, said silica sand being in the range of from 10 to 75% by weight of the foamed product, with the polyurethane being no less than about 20% by weight of the foamed product, said silica sand being of a mesh size of from No. 30 U.S. sieve to No. 200 U.S. sieve, said chopped glass fibers being 1/32" to 1" in length with each fiber being comprised of a plurality of filament strands, heating the mold to a temperature approximately at or above the temperature of the preheated materials, pouring the admixed components into the mold for foaming.

3. In a process for manufacturing in a mold a rigid polyurethane foam product having a density of from 10 to 80 lb/ft$^3$ with said foam being formed from the reaction of an isocyanate component and a polyol component having a highly branched polyol having a molecular weight per branch of approximately 300 to 800 with at least one said component having a suitable blowing agent, the steps comprising: heating the polyol component and isocyanate component to a preselected temperature above 74° F, mixing the preheated polyol component and isocyanate component, mixing in silica sand and chopped glass fibers with the viscosity of the admixed components being in the range of from around 1200 cps to 3600 cps, said chopped glass fibers being in the range of from 5 to 15% by weight of the foamed product, said silica sand being in the range of from 20 to 60% by weight of the foamed product, with the polyurethane being no less than about 20% by weight of the foamed product, said silica sand being of a mesh size of from No. 30 U.S. sieve to No. 200 U.S. sieve, said chopped glass fibers being 1/32" to 1" in length with each fiber being comprised of a plurality of filament strands, heating the mold to a temperature approximately at or above the temperature of the preheated materials, pouring the admixed components into the mold for foaming.

4. In a process for manufacturing in a mold a rigid polyurethane foam product having a density of from 10 to 80 lb/ft$^3$ with said foam being formed from the reaction of an isocyanate component and a polyol component having a highly branched polyol having a molecular weight per branch of approximately 300 to 800 with at least one said component including a suitable blowing agent, the steps comprising: heating the polyol component and isocyanate component to a preselected temperature above 74° F, mixing the preheated polyol component and isocyanate component, mixing in silica sand and chopped glass fibers, said chopped glass fibers being in the range of from 5 to 15% by weight of the foamed product, said silica sand being in the range of from 20 to 60% by weight of the foamed product, the grains of said silica sand being of a size substantially larger than finely divided silica and having a mesh size of from No. 30 U.S. sieve to No. 200 U.S. sieve, said chopped glass fibers being 1/32" to 1" in length with each fiber being comprised of a plurality of filament strands, pouring the admixed components into the mold for foaming.

5. In a process for manufacturing in a mold a rigid polyurethane foam product having a density of from 10 to 80 lb/ft³ with said form being formed from the reaction of an isocyanate component and a polyol component having a highly branched polyol having a molecular weight per branch of approximately 300 to 800 with at least one said component including a suitable blowing agent, the steps comprising: mixing the polyol component and isocyanate component, mixing in silica sand and chopped glass fibers with the viscosity of the admixed components being at a preselected magnitude sufficiently high to hold said glass fibers evenly distributed, said chopped glass fibers being in the range of from 3 to 25% by weight of the foamed product, said silica sand being of a preselected magnitude and sufficient to obviate the effects of air entrapped with said glass fibers, the grains of said silica sand being of a size substantially larger than finely divided silica and having a mesh size of from No. 30 U.S. sieve to No. 200 U.S. sieve, said chopped glass fibers being 1/32" to 1" in length with each fiber being comprised of a plurality of filament strands, pouring the admixed components into the mold for foaming.

6. In a process for manufacturing in a mold a rigid polyurethane foam product having a density of from 10 to 80 lb/ft³ with said foam being formed from the reaction of an isocyanate component and a polyol component having a highly branched polyol having a molecular weight per branch of approximately 300 to 800 with at least one said component including a suitable blowing agent, the steps comprising: mixing the polyol component and isocyanate component, mixing in silica sand and chopped glass fibers with the viscosity of the admixed components being at a preselected magnitude, said silica sand being in the range of from 10 to 75% by weight of the foamed product, said glass fibers being of a sufficient quantity to increase flexural modulus and impact strength by at least 25% over the flexural modulus and impact strength of the same product with the silica sand and without said glass fibers and with the same density, said silica sand being of a mesh size of from No. 30 U.S. sieve to No. 200 U.S. sieve, said chopped glass fibers being 1/32" to 1" in length with each fiber being comprised of a plurality of filament strands, pouring the admixed components into the mold for foaming.

7. The process of claim 3 with said chopped fibers being approximately ¼" in length.

8. The process of claim 7 with said chopped fibers being 200, 0.00052" diameter, filaments per strand.

9. The process of claim 4 with said chopped fibers being approximately ¼" in length.

10. The process of claim 5 with said chopped fibers being approximately ¼" in length.

11. A rigid polyurethane foam product made by a process for manufacturing said product in a mold and having a density of from 10 to 80 lb/ft³ with said product being formed from the reaction of an isocyanate component and a polyol component having a highly branched polyol having a molecular weight per branch of approximately 300 to 800 with at least one said component including a suitable blowing agent, the steps comprising: heating the polyol component and isocyanate component to a preselected temperature above 74° F, mixing the preheated polyol component and isocyanate component, mixing in silica sand and chopped glass fibers with the viscosity of the admixed components being in the range of from around 1200 cps to around 3600 cps, said chopped glass fibers being in the range of from 3 to 25% by weight of the foamed product, said silica sand being in the range of from 10 to 75% by weight of the foamed product, with the polyurethane being no less than about 20% by weight of the foamed product, said silica sand being of a mesh size of from No. 30 U.S. sieve to No. 200 U.S. sieve, said chopped glass fibers being 1/32" to 1" in length with each fiber being comprised of a plurality of filament strands, heating the mold to a temperature approximately at or above the temperature of the preheated materials, pouring the admixed components into the mold for foaming, said product having a flexural modulus at least 25% higher than a similar product made of the polyurethane alone and a flexural modulus and impact strength at least 25% higher than the combination of polyurethane and 15% silica sand, said product having said chopped glass fibers uniformly distributed throughout with little noticeable effects of air entrapped in processing.

12. A rigid polyurethane foam product made by a process for manufacturing in a mold a rigid polyurethane foam product having a density of from 10 to 80 lb/ft³ with said foam being formed from the reaction of an ixocyanate component side and a polyol component having a highly branched polyol having a molecular weight per branch of approximately 300 to 800, the steps comprising: mixing a fluorinated, halogenated saturated aliphetic hydrocarbon solvent blowing agent in the polyol component, said blowing agent having a boiling point greater than around 115° F, heating the polyol component and isocyanate component to a temperature around 115° F, mixing the preheated polyol component and isocyanate component, mixing in silica sand and chopped glass fibers with the viscosity of the admixed components being in the range of from around 1200 cps to 3600 cps, said chopped glass fibers being in the range of from 3 to 25% by weight of the foamed product, said silica sand being in the range of from 10 to 75% by weight of the foamed product, with the polyurethane being no less than about 20% by weight of the foamed product, said silica sand being of a mesh size of from No. 30 U.S. sieve to No. 200 U.S. sieve, said chopped glass fibers being 1/32" to 1" in length with each fiber being comprised of a plurality of filament strands, heating the mold to a temperature approximately at or above the temperature of the preheated materials, pouring the admixed components into the mold for foaming, said product having a flexural modulus at least 25% higher than a similar product made of the polyurethane alone, said product having said chopped glass fibers uniformly distributed throughout with little noticeable effects of air entrapped in processing.

13. A rigid polyurethane foam product made by a process for manufacturing in a mold a rigid polyurethane foam product having a density of from 10 to 80 lb/ft³ with said foam being formed from the reaction of an isocyanate component and a polyol component having a highly branched polyol having a molecular weight per branch of approximately 300 to 800 with at least one said component including a suitable blowing agent, the steps comprising: heating the polyol component and isocyanate component to a preselected temperature above 74° F, mixing the preheated polyol component and isocyanate component, mixing in silica sand and chopped glass fibers with the viscosity of the admixed components being in the range of from around 1200 cps to around 3600 cps, said chopped glass fibers being in the range of from 5 to 15% by weight of the foamed product, said silica sand being in the range of from 20 to 60% by weight of the foamed product, with the polyurethane being no less than about 20% by weight of the foamed product, said silica sand being of a mesh size of from No. 30 U.S. sieve to No. 200 U.S. sieve, said chopped glass fibers being 1/32" to 1" in length with each fiber being comprised of a plurality of filament strands, heating the mold to a temperature approximately at or above the temperature of the preheated materials, pouring the admixed components into the mold for foaming, said product having a flexural modulus and impact strength at least 20% higher than a similar product made of the polyurethane alone and at least twice the impact strength of such similar product made of the combination of polyurethane and 15% silica sand, said product having said chopped glass fibers uniformly distributed throughout with little noticeable effects of air entrapped in processing.

14. A rigid polyurethane foam product made by a process for manufacturing in a mold a rigid polyurethane foam product having a density of from 10 to 80 lb/ft$^3$ with said foam being formed from the reaction of an isocyanate component and a polyol component having a highly branched polyol having a molecular weight per branch of approximately 300 to 800 with at least one said component including a suitable blowing agent, the steps comprising: heating the polyol component and isocyanate component to a preselected temperature above 74° F, mixing the preheated polyol component and isocyanate component, mixing in silica sand and chopped glass fibers, said chopped glass fibers being in the range of from 5 to 15% by weight of the foamed product, said silica sand being in the range of from 20 to 60% by weight of the foamed product, the grains of said silica sand being of a size substantially larger than finely divided silica and having a mesh size of from No. 30 U.S. sieve to No. 200 U.S. sieve, said chopped glass fibers being 1/32" to 1" in length with each fiber being comprised of a plurality of filament strands, pouring the admixed components into the mold for foaming, said product having a flexural modulus and impact strength at least 20% higher than a similar product made of the polyurethane alone and at least twice the impact strength of such similar product made of the combination of polyurethane and 15% silica sand, said product having said chopped glass fibers uniformly distributed throughout with little noticeable effects of air entrapped in processing.

15. A rigid polyurethane foam product made by a process for manufacturing in a mold a rigid polyurethane foam product having a density of from 10 to 80 lb/ft$^3$ with said foam being formed from the reaction of an isocyanate component and a polyol component having a highly branched polyol having a molecular weight per branch of approximately 300 to 800 with at least one said component including a suitable blowing agent, the steps comprising: mixing the polyol component and isocyanate component, mixing in silica sand and chopped glass fibers with the viscosity of the admixed components being at a preselected magnitude sufficiently high to hold said glass fibers evenly distributed, said chopped glass fibers being in the range of from 3 to 25% by weight of the foamed product, said silica sand being of a preselected quantity to at least assure said viscosity of said preselected magnitude and sufficient to obviate the effects of air entrapped with said glass fibers, the grains of said silica sand being of a size substantially larger than finely divided silica and having a mesh size of from No. 30 U.S. sieve to No. 200 U.S. sieve, said chopped glass fibers being 1/32" to 1" in length with each fiber being comprised of a plurality of filament strands, pouring the admixed components into the mold for foaming, said product having a flexural modulus at least 20% higher than a similar product made of the polyurethane alone and at least twice the impact strength of such similar product made of the combination of polyurethane and 15% silica sand, said product having said chopped glass fibers uniformly distributed throughout with little noticeable effects of air entrapped in processing.

16. A rigid polyurethane foam product made by a process for manufacturing in a mold a rigid polyurethane foam product having a density of from 10 to 80 lb/ft$^3$ with said foam being formed from the reaction of an isocyanate component and a polyol component having a highly branched polyol having a molecular weight per branch of approximately 300 to 800 with at least one said component including a suitable blowing agent, the steps comprising: mixing the polyol component and isocyanate component, mixing in silica sand and chopped glass fibers with the viscosity of the admixed components being at a preselected magnitude, said silica sand being in the range of from 10 to 75% by weight of the foamed product, said glass fibers being of a sufficient quantity to increase flexural modulus by at least 20% over the flexural modulus of the same product without said glass fibers and with the same density, said silica sand being of a mesh size of from No. 30 U.S. sieve to No. 200 U.S. sieve, said chopped glass fibers being 1/32" to 1" in length with each fiber being comprised of a plurality of filament strands, pouring the admixed components into the mold for foaming, said product having a flexural modulus at least 20% higher than a similar product made of the polyurethane alone and at least twice the impact strength of such similar product made of the combination of the polyurethane and 15% silica sand, said product having said chopped glass fibers uniformly distributed throughout with little noticeable effects of air entrapped in processing.

17. The product of claim 13 with said chopped fibers being approximately ¼" in length.

18. The product of claim 17 with said chopped fibers being 200, 0.00052" diameter, filaments per strand.

19. The product of claim 14 with said chopped fibers being approximately ¼" in length.

20. The product of claim 15 with said chopped fibers being approximately ¼" in length.

* * * * *

UNITED STATES PATENT AND TRADEMARK OFFICE
CERTIFICATE OF CORRECTION

PATENT NO. : 4,005,035
DATED : January 25, 1977
INVENTOR(S) : Dann T. Deaver

It is certified that error appears in the above-identified patent and that said Letters Patent are hereby corrected as shown below:

Column 5, line 5, delete "is" and substitute therefor --are--.

Column 5, line 22, before "surface" delete --the--.

Column 5, line 56, insert --American Foundry Standard".

Column 5, line 61, delete "American Foundry Standard".

Table A, Example VIII, Composition, after "10% Glass Fiber" insert --(1/32")--.

Column 11, line 65, delete "side" and substitute therefor --component--.

Column 12, line 13, delete "side" and substitute therefor --component--.

Column 14, line 33, delete "ixocyanate component side" and substitute therefor --isocyanate component--.

Signed and Sealed this fifth Day of July 1977

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 4,005,035
DATED : January 25, 1977
INVENTOR(S) : Dann T. Deaver

It is certified that error appears in the above-identified patent and that said Letters Patent are hereby corrected as shown below:

Column 12, line 9, delete "side" and substitute therefor --component--.

Signed and Sealed this

Twentieth Day of September 1977

[SEAL]

Attest:

RUTH C. MASON
Attesting Officer

LUTRELLE F. PARKER
Acting Commissioner of Patents and Trademarks